United States Patent [19]

Newton, Jr.

[11] 4,225,500

[45] Sep. 30, 1980

[54] NOVEL POLYMERIC COMPOSITIONS FOR FOOTWEAR TREAD MEMBERS CONTAINING A HALOGENATED POLYETHYLENE AND A BLOCK COPOLYMER

[75] Inventor: Charles G. Newton, Jr., Wenham, Mass.

[73] Assignee: USM Corporation, Farmington, Conn.

[21] Appl. No.: 27,874

[22] Filed: Apr. 6, 1979

[51] Int. Cl.² .................. C08K 5/01; C08L 51/00; C08L 53/00

[52] U.S. Cl. ................. 260/33.6 AQ; 260/33.6 UA; 260/42.32; 260/42.34; 260/42.47; 525/98

[58] Field of Search ............... 525/98; 260/33.6 UA, 260/33.6 AQ

[56] References Cited

U.S. PATENT DOCUMENTS

| | | | |
|---|---|---|---|
| 3,589,036 | 6/1971 | Hendricks et al. | 36/2.5 |
| 3,614,836 | 10/1971 | Snyder et al. | 36/2.5 |
| 4,006,116 | 2/1977 | Dominquez | 260/33.6 AQ |

Primary Examiner—Richard B. Turer
Attorney, Agent, or Firm—John P. Morley; Richard B. Megley; Vincent A. White

[57] ABSTRACT

Novel compositions comprising polystyrene-polydiene-polystyrene block copolymers and an amount of a halogenated polyolefin effective to provide improved resistance to solvents or oils. The compositions are particularly useful for preparing footwear tread members.

17 Claims, No Drawings

NOVEL POLYMERIC COMPOSITIONS FOR FOOTWEAR TREAD MEMBERS CONTAINING A HALOGENATED POLYETHYLENE AND A BLOCK COPOLYMER

THE FIELD OF THE INVENTION

This invention relates to novel, improved thermoplastic elastomeric compositions particularly useful in the footwear industry for providing footwear tread members.

DESCRIPTION OF THE PRIOR ART

Block copolymers of polystyrene—polydiolefin—polystyrene are well known in the art. It is also well known that within certain ranges of molecular weight, the block copolymers have elastomeric properties in the unvulcanized state and they can be processed in thermoplastic processing equipment at temperatures usually above their softening point to provide, for example, footwear tread members such as shoe outsoles and heels. Because the block copolymers are elastomeric in the unvulcanized state, they provide special advantages since they can be reprocessed without serious loss of their properties thereby permitting reuse of scrap from processing operations.

Block copolymers of the type discussed above have excellent properties so far as hardness, weatherability, heat and abrasive resistance, moldability etc. are concerned. They also have excellent resistance to water, bases and acids. However—as those in the art know—prolonged contact of the block copolymers with solvents or oils—especially hydrocarbon solvents or oils—causes serious degradation of the block copolymers. Particularly rapid degradation is caused by contact of the block copolymers with vegetable oils.

BRIEF SUMMARY OF THE INVENTION

This invention presents to the art, novel, improved compositions comprising thermoplastic elastomeric polystyrene—polydiene—polystyrene block copolymers which are elastomeric in their unvulcanized state and have improved resistance to solvents and oils. In accordance with the practice of this invention a halogenated polyolefin is included in the composition in an amount effective to improve the resistance of the composition to solvents and/or oils. Essentially, the essence of the present invention resides in the unexpected discovery that there is a distinctive cause and effect relationship existing between the resistance of thermoplastic, elastomeric block copolymer compositions to solvents and oils and the amount of halogenated polyolefin included in the composition.

DESCRIPTION OF THE PREFERRED EMBODIMENT

The preferred novel compositions of this invention essentially include an intimate mixture of thermoplastic elastomeric block copolymers (such as polystyrene—polyisoprene—polystyrene and/or polystyrene—polybutadiene—polystyrene block copolymers) with an amount of a halogenated polyolefin—particularly chlorinated polyethylene—effective to improve the solvent or oil resistance of the composition. Additionally, the compositions of this invention can comprise other additives normally included in such compositions such as extending oils or plasticizers, reinforcing fillers or pigments, polystyrene materials, and stabilizers among others.

Thermoplastic, elastomeric block copolymers such as block copolymers of polystyrene—polyisoprene—polystyrene and/or polystyrene—polybutadiene—polystyrene useful in the practice of this invention are well known to the art and are commercially available. The Shell Chemical Company for example offers such block copolymers in pellet or crumb form designed for the footwear industry under the Trademark KRATON Thermoplastic Rubbers. Also, Phillips Petroleum Company offers such thermoplastic elastomeric block copolymers designed for the footwear industry under the Trademark SOLPRENE. Additional details relating to such thermoplastic elastomeric block copolymers can be found in U.S. Pat. Nos. 3,589,036; 3,614,836 and 4,006,116.

In accordance with the practice of this invention, improved resistance of the thermoplastic elastomeric block copolymer composition to solvents or oils can be obtained by intimately mixing, dispersing or otherwise blending a halogenated polyolefin polymer and preferably a chlorinated or partially chlorinated polyolefin with the block copolymer(s) containing composition. Amounts of halogenated polyolefin polymers particularly preferred in the practice of the invention are amounts between about 4 to about 20 by weight based on the weight of the composition. The particularly preferred halogenated polyolefin polymer is a chlorinated polyethylene having a chlorine content between about 5% to about 50% by weight and preferably a chlorine content of at least about 25% by weight and having a melt viscosity at 190° C. and 150 sec$^{-1}$ of from about 8,000 to about 22,000 poises. Such chlorinated polyethylenes are known and are commercially available. They are offered for example, by Dow Chemical Company under the designation DOW CPE Resins.

As mentioned, extender oils or plasticizers are normally included additives in the thermoplastic elastomeric compositions used in the footwear industry. Oftentimes, extender oil or plasticizer is included during the manufacture of the block copolymer. More often than not, additional extender oil or plasticizer is added in processing the block copolymers to provide a desired end product. The extender oils or plasticizers can be oils or waxes and in some instances resins, asphalts or other polymers may be used. General characteristics desirable in an extender oil or plasticizer are, low viscosity, low volatility, low density and resistance to degradation. Hydrocarbon rubber extender oils are normally employed and are usually referred to as paraffinic/naphthenic oils. They are usually fractions of refined petroleum products having less than about 30% by weight of aromatics (by clay-gel analysis) and usually have viscosities between about 100 and 500 SSU at 100° F. Compositions of this invention may contain up to about 125 parts of extender oil per 100 parts of block copolymer.

Usually, thermoplastic elastomeric block copolymer compositions used in the footwear industry also include polystyrene materials used as processing aids or as modifying resins to improve certain properties such as modulus, tensile strength abrasion resistance or elongation. These polystyrenes are known to the art and can include molding grade polystyrenes and low molecular weight poly α-methyl polystyrenes. It should be mentioned that improved resistance to solvents and/or oils can be obtained by excluding the polystyrene materials from the block copolymer composition. However, excluding the polystyrene materials can affect the desired balance of performance characteristics of the block copolymer compositions such as modulus, tensile, abrasion resistance and elongation properties. The preferred copolymer compositions of this invention definitely include the polystyrene materials and have improved resistance to solvents and/or oils coupled with desirable modulus, tensile, abrasion resistance and elongation properties.

Fillers usually included in thermoplastic elastomeric block copolymer compositions can include inorganic fillers such as whiting, clay, talc, silica, carbon black, titanium dioxide, calcium carbonate etc. Organic fillers such as wood, flour or starch etc. may also be used. Also very fine particle size fillers such as bentonite clay or "Cab-O-Sil" sold by Cabot Corporation can be used if desired.

The thermoplastic, elastomeric block copolymers usually have some degree of unsaturation and accordingly are susceptible to attack by oxygen, ozone and ultraviolet radiation especially when stressed. Antioxidents at least are normally included in the manufactured block copolymers to provide protection during manufacture, storage and shipment. However, additional stabilizers are normally added in processing molding or forming the block copolymers and suitable antioxidants, antiozonants and ultraviolet inhibitors are well known to the art.

The components mentioned above may be compounded in manners well known to the art using any suitable apparatus such as a screw-type extruder or other apparatus well known to the art for forming either slab stock or molded footwear treads such as outsoles for later attachment to shoe uppers.

The following table is illustrative of footwear tread member compositions of the invention.

TABLE I

| MATERIAL | % BY WEIGHT | PREFERRED % BY WEIGHT |
|---|---|---|
| Thermoplastic, Elastomeric[1] Block Copolymer | 20-95 | 30-55 |
| Chlorinated polyethylene | 1-35 | 4-20 |
| Polystyrene Material | 0-15 | 4-15 |
| Extender oil or Plasticizer[2] | 0-50 | 20-45 |
| Filler | 0-55 | 5-25 |

[1] % by weight of block copolymer only and not including any extender or plasticizer oil added during manufacture of the copolymer.
[2] Total % by weight of oil or plasticizer in the composition. Some block copolymers contain extender oil or plasticizer which is included in the block copolymers at the time of manufacture.

The following Examples are given so that those skilled in the art may better appreciate how to make and use the invention. It should be understood that the invention is not restricted to the particular proportions involved or to the procedures involved for compounding or forming the products of the Examples.

In each of the following Examples, the composition described was mixed on a hot, two-roll mill and a compression molded at 325° F. for 10 minutes to obtain a test slab. Two ¼ inch thick by 5 inch long specimen were provided from each slab with a 1/10 inch long notch in its center portion and the ends of the specimen were clipped together from the ends of the strip to form a closed U. One of the specimens was then immersed in a detergent oil (Arco 10-40) at 20° C. and examined daily to determine the days required to cause 1000% crack growth (complete cracking). The other specimen was immersed in a vegetable cooking oil at 20° C. and also was examined daily to determine the days required to cause 1000% crack growth. The vegetable oil was a commercially available mixture of sunflower and soy bean oils sold under the trade name "Puritan Oil" by Proctor and Gamble.

EXAMPLE 1

A soling stock of this invention was prepared by molding a mixture of the following ingredients:

| MATERIAL | PARTS BY WEIGHT | % BY WEIGHT |
|---|---|---|
| Polystyrene-Polybutadiene-Polystyrene Block Copolymer[A] | 100 | 64 |
| Added Extender Oil[B] | 30 | 19 |
| Chlorinated Polyethylene[C] | 15 | 9.6 |
| Filler[D] | 10 | 6.4 |
| Polystyrene Material | 0 | 0 |
| Stabilizers[E] | 1.2 | 0.8 |

[A] In this and all following Examples except Example 4, the block copolymer used was KRATON 4140 a block copolymer commercially available from Shell Chemical Company and having an extender or plasticizer oil content of about 35% by weight. The actual % by weight of block copolymer in the composition therefore is about 42%.
[B] In this and all following Examples, the Added Extender Oil was SHELLFLEX 371 (distillation range 710-865° F.) which is a commercially available extender oil (Shell Chemical Company) believed to contain 2% by weight aromatic carbon atoms and 98% paraffinic and naphthenic. Since the block copolymer (KRATON 4140) contains about 35% by weight of extender oil, the total % by weight of oil and/or plasticizer in the composition is about 42%.
[C] In this Example the chlorinated Polyethylene had a chlorine content of 42% by weight and a melt viscosity of 19,500 poises at 190° C. and 150 sec$^{-1}$.
[D] In this and in all following Examples, the filler was HI-SIL-233 which is a commercially available silica sold by PPG Industries.
[E] In this and in all following Examples, the stabilizers included 0.3 parts of Octadecyl 3- (3',5'-di tert-butyl-4 hydroxyphenyl propionate, (an antioxidant), 0.3 parts of dilauryl thiodipropionate (an antioxidant); 0.3 parts of a substituted benzotriazide (an ultraviolet inhibitor) and 0.3 parts of calcium stearate.

EXAMPLE 2

A soling stock of this invention was prepared by molding a mixture of the following ingredients:

| MATERIAL | PARTS BY WEIGHT | % BY WEIGHT |
|---|---|---|
| Polystyrene-Polybutadiene-Polystyrene Block Copolymer | 100 | 64 |
| Added Extender Oil | 30 | 19 |
| Chlorinated Polyethylene[F] | 15 | 9.6 |
| Filler | 10 | 6.4 |
| Polystyrene Material | 0 | 0 |
| Stabilizers | 1.2 | 0.8 |

[F] In this Example, the Chlorinated Polyethylene had a chlorine content of about 36% by weight and a melt viscosity of 10,000 poises at 190° C. and 150 sec$^{-1}$.

EXAMPLE 3

A soling stock of this invention was prepared by molding a mixture of the following ingredients:

| MATERIAL | PARTS BY WEIGHT | % BY WEIGHT |
|---|---|---|
| Polystyrene-Polybutadient-Polystyrene Copolymer | 100 | 58.4 |
| Added Extender Oil | 30 | 17.5 |
| Chlorinated Polyethylene[G] | 15 | 8.8 |
| Filler | 10 | 5.8 |
| Polystyrene Material[H] | 7.5 | 8.8 |

| MATERIAL | PARTS BY WEIGHT | % BY WEIGHT |
|---|---|---|
| Stabilizers | 1.2 | 0.8 |

$^G$In this Example and in Example 4, the chlorinated Polyethylene had a chlorine content of about 42% by weight and a melt viscosity of 19,500 poises at 190° C. and 150 sec$^{-1}$.
$^H$In this Example and in Example 6, the Polystyrene Material was a poly-α-methyl styrene having a m.p. of about 290° C. and sold under the trade name AMOCO RESIN 18-290 by Amoco Chemical Company.

EXAMPLE 4

A soling stock of this invention was prepared by molding a mixture of the following ingredients:

| MATERIAL | PARTS BY WEIGHT | % BY WEIGHT |
|---|---|---|
| Polystyrene-Polybutadiene$^I$ Polystyrene Block Copolymer | 100 | 64 |
| Added Extender Oil | 30 | 19 |
| Chlorinated Polyethylene$^G$ | 7.5 | 4.8 |
| Filler | 10 | 6.4 |
| Polystyrene Material$^J$ | 7.5 | 4.8 |
| Stabilizers | 1.2 | 0.8 |

$^G$See Example 3.
$^I$In this Example, the block copolymer used was SOLPRENE 481, a block copolymer commercially available from Phillips Petroleum Company and having a extender or plasticizer oil content of about 37.5% by weight.
$^J$In this Example and in Example 5, the polystyrene material was a molding grade polystyrene resin sold under the Trade name COSDEN 500 SPI by Cosden Petroleum Incorporated.

EXAMPLE 5

A control soiling stock was prepared by molding a mixture of the following ingredients:

| MATERIAL | PARTS BY WEIGHT | % BY WEIGHT |
|---|---|---|
| Polystyrene-Polybutadine-Polystyrene Block Copolymer | 100 | 64 |
| Added Extender Oil | 30 | 19 |
| Chlorinated Polyethylene | 0 | 0 |
| Filler | 10 | 6.4 |
| Polystyrene Material$^J$ | 15 | 9.6 |
| Stabilizers | 1.2 | 0.8 |

$^J$See Example 4.

EXAMPLE 6

A control soiling stock was prepared by molding a mixture of the following ingredients:

| MATERIAL | PARTS BY WEIGHT | % BY WEIGHT |
|---|---|---|
| Polystyrene-Polybutadiene-Polystyrene Block Copolymer | 100 | 64 |
| Added Extender Oil | 30 | 19 |
| Chlorinated Polyethylene | 0 | 0 |
| Filler | 10 | 6.4 |
| Polystyrene Material$^H$ | 15 | 9.6 |
| Stabilizers | 1.2 | 0.7 |

$^H$See Example 3.

TABLE 2

The following table is a compilation of data relating to the compositions of Examples 1-6.

| Example No. | Durometer (Shore A) | 100 Modulus (psi) | Tensile psi | Elongation % | Days for 1000% Cracking | |
|---|---|---|---|---|---|---|
| | | | | | Detergent Oil | Vegetable Cooking Oil |
| 1 | 55 | 185 | 680 | 790 | >18 days | 4 days |
| 2 | 55 | 170 | 690 | 805 | >18 days | >18 days |
| 3 | 65 | 180 | 830 | 775 | >18 days | >18 days |
| 4 | 48 | 185 | 715 | 705 | >18 days | 16 days |
| 5 | 50 | 205 | 755 | 565 | 2 days | <1 day |
| 6 | 57 | 195 | 770 | 645 | 2 days | <1 day |

< = less than
> = greater than

According to the data of the above table, the compositions of Examples 1-6 are substantially similar in terms of Durometer, Modulus, Tensile and Elongation. The Modulus and Tensile of the compositions of Examples 1, 2 and 4 are somewhat lower than those of control Examples 5 and 6 but the tensile of the composition of Example 3 is somewhat higher than the tensile of the control Examples. Also, the elongation values of the compositions of Examples 1-4 are substantially higher than those values of the compositions of Examples 5 and 6. The most significant difference between the compositions of Examples 1-4 and those of Examples 5 and 6 is in the markedly superior resistance of the compositions of Examples 1-4 to hydrocarbon solvents or oils as compared to the hydrocarbon solvent or oil resistance of the compositions of Examples 5 and 6. The compositions of Examples 2-4 are also highly resistant to vegetable oils which generally degrade block copolymers faster than hydrocarbon solvents or oils. The improved solvent or oil resistance of compositions of this invention presents to the art novel block copolymer compositions having valuable and desirable performance characteristics particularly for compositions used in the footwear industry.

I claim:
1. A composition comprising a thermoplastic, elastomeric block copolymer(s) of a polystyrene—polyisoprene—polystyrene and/or a polystyrene—polybutadiene—polystyrene in an amount between about 20% to about 95% by weight of the composition; a halogenated polyethylene polymer having a halogen content between about 5% to about 50% by weight and the halogenated polyethylene polymer is present in an amount between about 1% to about 35% by weight of the composition; an extender oil or plasticizer in an amount between 0% to about 50% by weight of the composition and, a polystyrene material in an amount between 0% to about 15% by weight of the composition.
2. A composition of claim 1 where the halogenated polyethylene polymer has a halogen content between about 25 to about 50% by weight.

3. A composition of claim 1 where the halogenated polyethylene polymer is present in the composition in an amount between about 4% to about 20% by weight based on the weight of the composition.

4. A composition of claim 1 where the extender oil or plasticizer is present in the composition in an amount between about 25% to about 50% by weight of the composition.

5. A composition of claim 1 where the polystyrene material is present in the composition in an amount between about 4 to about 15% by weight of the composition.

6. A composition of claim 1 including a filler in an amount between about 5% to about 15% by weight of the composition.

7. A composition of claim 1 including a stabilizer.

8. A composition comprising a thermoplastic, elastomeric block copolymer(s) of a polystyrene—polyisoprene—polystyrene and/or a polystyrene—polybutadiene—polystyrene in an amount between about 20% to about 95% by weight of the composition; a chlorinated polyethylene polymer having a chlorine content between about 5% to about 50% by weight and the chlorinated polyethylene polymer is present in an amount between about 1% to about 35% by weight of the composition; an extender oil or plasticizer in an amount between 0% to about 50% by weight of the composition and, a polystyrene material in an amount between 0% to about 15% by weight of the composition.

9. A composition of claim 8 where the chlorine content of the chlorinated polyethylene polymer is about 25% to about 50% by weight.

10. A composition of claim 8 where the chlorinated polyethylene polymer is present in the composition in an amount between about 4% to about 20% by weight based on the weight of the composition.

11. A composition of claim 8 where the chlorinated polyethylene polymer has a chlorine content between about 25% to about 50% by weight and the chlorinated polyethylene polymer is present in the composition in an amount between about 4% to about 20% by weight of the composition.

12. A composition of claim 8 where the extender oil or plasticizer is present in the composition in an amount between about 25% to about 50% by weight of the composition.

13. A composition of claim 8 where the polystyrene material is present in the composition in an amount between about 4 to about 15% by weight of the composition.

14. A composition of claim 8 including a filler in an amount between about 5% to about 15% by weight of the composition.

15. A composition of claim 8 including a stabilizer.

16. A molded footwear tread member which comprises the composition of claim 1.

17. A molded footwear tread member which comprises the composition of claim 8.

* * * * *